United States Patent
Koryakina et al.

(10) Patent No.: US 8,307,358 B1
(45) Date of Patent: Nov. 6, 2012

(54) METHOD AND SYSTEM FOR UNATTENDED INSTALLATION OF GUEST OPERATING SYSTEM

(75) Inventors: Elena A. Koryakina, Moscow (RU); Alexey B. Koryakin, Moscow (RU); Nikolay N. Dobrovolskiy, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 1010 days.

(21) Appl. No.: 12/143,570

(22) Filed: Jun. 20, 2008

Related U.S. Application Data (60) Provisional application No. 60/948,779, filed on Jul. 10, 2007.

(51) Int. Cl.
G06F 9/445 (2006.01)
G06F 9/45 (2006.01)
G06F 9/455 (2006.01)

(52) U.S. Cl. ............... 717/174; 717/138; 718/1

(58) Field of Classification Search ............... None
See application file for complete search history.

(56) References Cited

U.S. PATENT DOCUMENTS

| | | | | |
|---|---|---|---|---|
| 5,555,416 A * | 9/1996 | Owens et al. | | 717/178 |
| 6,910,208 B1 * | 6/2005 | Zimniewicz | | 717/174 |
| 7,409,647 B2 * | 8/2008 | Elber et al. | | 715/848 |
| 7,424,710 B1 * | 9/2008 | Nelson et al. | | 718/1 |
| 7,464,412 B2 * | 12/2008 | Avraham et al. | | 726/34 |
| 7,552,426 B2 * | 6/2009 | Traut | | 717/138 |
| 7,627,821 B2 * | 12/2009 | Klementiev | | 715/704 |
| 7,694,223 B2 * | 4/2010 | Corson | | 715/704 |
| 7,890,948 B2 * | 2/2011 | Bergman et al. | | 717/174 |
| 8,166,474 B1 * | 4/2012 | Delco et al. | | 718/1 |
| 2002/0133810 A1 * | 9/2002 | Giles et al. | | 717/138 |
| 2003/0217359 A1 * | 11/2003 | Ohi et al. | | 717/174 |
| 2006/0005187 A1 * | 1/2006 | Neil | | 718/1 |
| 2006/0010433 A1 * | 1/2006 | Neil | | 717/138 |
| 2006/0218544 A1 * | 9/2006 | Chakraborty et al. | | 717/168 |
| 2007/0050719 A1 * | 3/2007 | Lui et al. | | 715/762 |
| 2007/0074191 A1 * | 3/2007 | Geisinger | | 717/148 |
| 2007/0168937 A1 * | 7/2007 | Mallick | | 717/106 |
| 2007/0180448 A1 * | 8/2007 | Low et al. | | 718/1 |
| 2007/0220510 A1 * | 9/2007 | Bell et al. | | 717/174 |
| 2008/0086728 A1 * | 4/2008 | Lam et al. | | 718/1 |
| 2009/0019436 A1 * | 1/2009 | Hartz et al. | | 717/178 |

OTHER PUBLICATIONS vmware, Virtualization Overview, VMware, Inc, 2006, pp. 3-8.*
Brandon D. Shroyer, OS Virtualization, CSC 456 Final Presentation, 2007, pp. 3-22.*
Robert Rose, Survey of System Virtualization Techniques, 2004, pp. 3-8.*

* cited by examiner

*Primary Examiner* — Thuy Dao
*Assistant Examiner* — Mongbao Nguyen
(74) *Attorney, Agent, or Firm* — Bardmesser Law Group (57) ABSTRACT

A method and system for an unattended installation of any type of a guest operating system (GOS) on a Virtual Machine (VM). Proposed method and system allow users to create an executable script, which provides automation of any GOS installation on the VM. User actions, such as mouse clicks and keyboard strokes, performed during GOS installation are recorded. The delays, time periods between clicks and strokes are recorded as well. All of this information is incorporated into an executable script. The script, when executed, simulates/reproduces GOS action sequence. This sequence reflects the behavior of GOS itself executed on a VM. The executable script is OS-independent and runs on top of system OS.

16 Claims, 6 Drawing Sheets

METHOD AND SYSTEM FOR UNATTENDED INSTALLATION OF GUEST OPERATING SYSTEM

CROSS-REFERENCE TO RELATED APPLICATIONS

The present application claims priority to the U.S. Provisional Patent Application No. 60/948,779, filed Jul. 10, 2007, entitled METHOD AND SYSTEM FOR UNATTENDED INSTALLATION OF GUEST OPERATING SYSTEM, which is incorporated herein by reference in its entirety.

BACKGROUND OF THE INVENTION

1. Field of the Invention

The present invention relates generally to Virtual Machine (VM) technology and, more particularly, to a method and system for unattended installation of a guest operating system (GOS) in a VM.

2. Background Art

In the past decade, capabilities of computer systems have increased significantly. Computer systems process large volumes of information entered by a user through an application graphical user interface (GUI). Typically users not only enter data, but also invoke a large number of the same events or sequences of actions when using a particular application. For example, users click on certain GUI buttons to invoke the events and use keystrokes on a keyboard to enter data. User actions can be recorded and automatically replicated.

Figure 1:
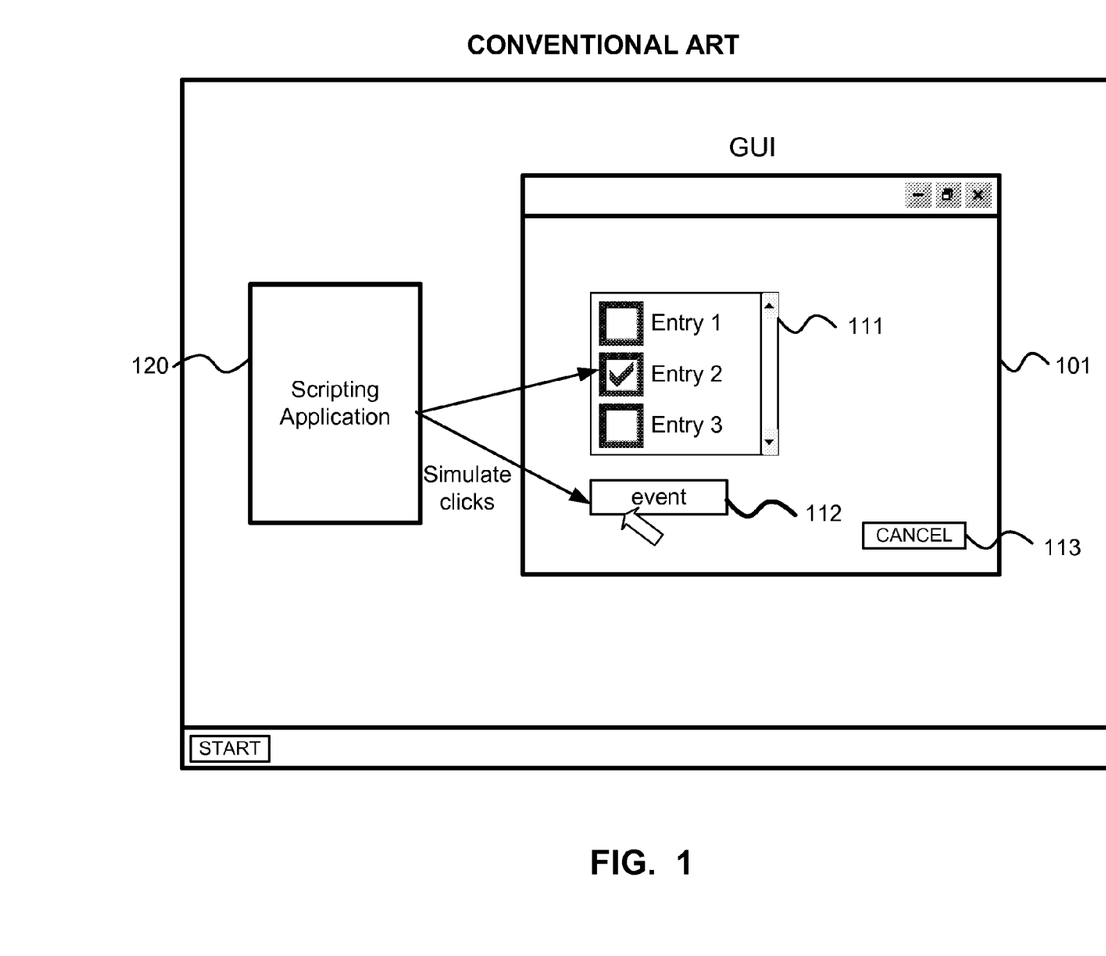
FIG. 1 illustrates an example of a conventional automation system.

There are a number of systems for recording and automating user mouse clicks and keyboard strokes. A conventional system typically records the sequences of user actions, such as keystrokes and mouse clicks, and reproduces this sequence as an executable script. An example of such a system is illustrated in FIG. 1. GUI 101 has event buttons 112 and 113 and a list of entries 111. The sequence of mouse clicks made by a user is recorded and incorporated into a scripting application 120. When the scripting application 120 is executed, it simulates the user activity. Thus, all of the user actions can be automatically reproduced later.

An example of a conventional scripting application such as the one depicted in FIG. 1 is Apple Script™. This application incorporates into a script the sequences of keystrokes and mouse clicks. It also adds to the script commands delays, and start and stop times of certain action performed with the GUI. Thus, all of the constantly performed user actions are automatically reproduced in exact same manner.

Figure 2:
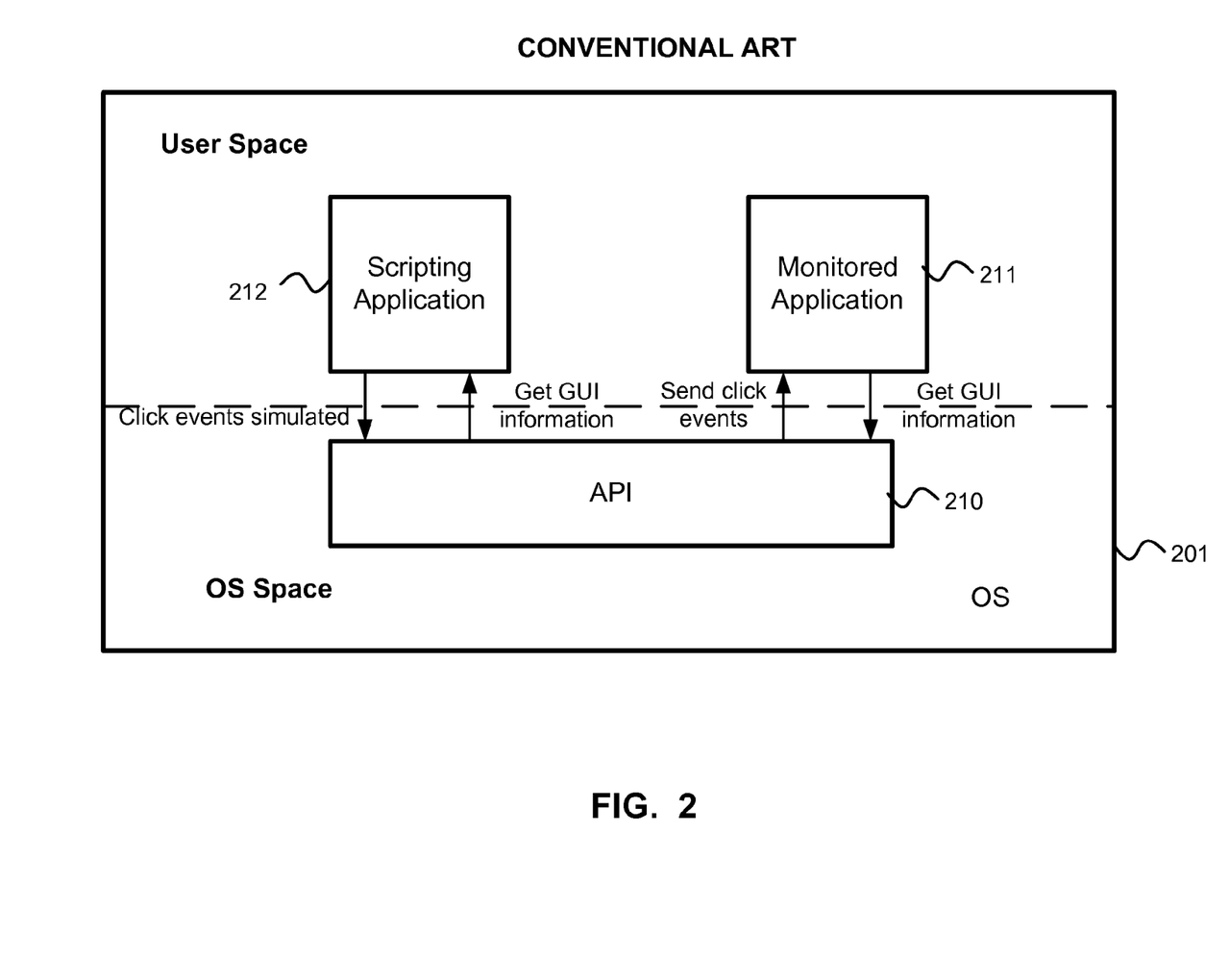
FIG. 2 illustrates an example of a conventional scripting application using system API.

A typical scripting application is executed in an operating system (OS) and uses system API calls for acquiring the information from a GUI of a monitored application. It also uses OS API functions for performing simulated user actions on the application's GUI. An example of such a system is shown in FIG. 2. A scripting application 212 and a monitored GUI of application 211 run under OS 201 in user space. Scripting application 212 uses OS API 210 calls to get information about user actions from GUI of monitored application 211. It also uses API 210 from OS space for executing simulated user actions on GUI of application 211. Thus, user actions are simulated and replicated internally within the computer system OS 201.

Another example of user simulating application is Rational Robot (www.rationalrobot.com), which allows automated testing of applications. Rational Robot first records the tester's mouse/keyboard actions, as well as delays caused by the tester waiting for the GUI window to appear or become available. Then the information about tester's actions and delays is incorporated into a script for an automated test plan. Rational Robot analyzes the results of test script execution and posts bugs to the Clear Quest bug tracking system automatically.

Conventional simulation systems may run on a physical computer system and utilize the computer's OS. The industry trend of virtualization and isolation of computer system resources makes the task of automating user activities more complex. A Virtual Machine (VM) is a type of an isolated Virtual Execution Environment that runs on the same physical machine simultaneously with the host OS. Each VM instance executes its own OS kernel. Support of Virtual Machines is implemented using a VM Monitor and/or a Hypervisor.

Virtualization allows running a number of VMs on the same physical machine or processor. Thus, each of the VMs needs automation of user activities, in particular when a guest OS needs to be installed in the VM. However, a conventional scripting application can only run in the host OS. In case of installation of a guest OS on a VM, it is not possible to use any existing scripting applications for automation of the installation process.

Accordingly, there is a need for a system and a method for an automatic unattended installation of any type of a guest OS on a Virtual Machine.

SUMMARY OF THE INVENTION

The present invention relates generally to Virtual Machine (VM) technology and, more particularly, to a method and system for unattended installation of any type of a guest operating system (GOS) in a VM or installation of other applications that can run on GOS installed in the VM. The proposed method allows users to create an executable script, which allows automating any GOS-related installation in the VM.

User actions, such as mouse clicks and keyboard strokes, performed by a user during GOS installation are recorded. The delays between clicks and strokes are recorded as well. This information is incorporated into an executable script.

The delays recorded during the GOS installation are caused by a user waiting for GOS video frames and/or images to appear in the GOS video output. GOS video frames/images can be any parts of GOS visual interface located in GOS buffer. Thus, according to the proposed method, the script can simulate/reproduce GOS action sequence. This sequence reflects the behavior of GOS itself executed on a VM and not the behavior of an application executed on system's OS like it is implemented in the conventional physical computer systems.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

The present invention is directed to a method and a system for unattended installation of any type of a guest operating system (GOS) in a VM and installation of any applications on GOS installed in the VM. According to the proposed method, users can create an executable script, which allows automating any GOS installation on the VM.

The invention may be implemented using a Virtual Machine (VM), which is a type of an isolated Virtual Execution Environment that runs on the same physical machine simultaneously with the host OS. Each VM instance executes its own OS kernel and is supported by VM Monitor and/or a Hypervisor of different types.

Another approach available for implementation of the exemplary embodiment can include Virtual Environments sharing at least some of the system resources, e.g., Virtuozzo's™ OS virtualization solution of SWsoft, Inc. where a single instance of the OS is shared by multiple virtual servers.

In one embodiment, a method and a system for generating a script for automating GOS installation is provided. The proposed method allows users to record user actions, such as mouse clicks/moves and keyboard strokes (and more generally, interaction with peripheral input devices, e.g., trackballs, speech recognition devices, etc.), performed during GOS installation. The delays, and any time periods between clicks and strokes, are recorded as well. This information is incorporated into an executable script.

The delays recorded during the GOS installation are caused by the user waiting for GOS video frames/images to appear in the GOS video output. GOS video frames/images can be any parts of GOS visual interface located in a GOS buffer. GOS visual interface can have buttons, entry lists, images, forms, etc.

According to the exemplary embodiment, the script, when executed, can simulate/reproduce GOS action sequence. This sequence reflects the behavior of GOS itself executed on a VM and not the behavior of an application executed on a system's Host OS, as would be the case with the conventional computer systems.

In the preferred embodiment, common scripting languages (e.g., VBScript, C/C++ compilers, JAVAScript, ShellScript, etc.) or high-level programming languages (e.g., VB, C/C++, JAVA, C#, etc.) can be used for controlling a computer system. These languages interact with the same graphic windows, menus, buttons, etc. generated by the system.

It should be noted that other types of mechanisms for controlling the computer system can be used to implement the invention. For example, executable code that does not require command line or other types of scripts can be used (e.g., object-oriented code provided by script compilation, dll, etc.).

When performing the proposed method, not only manipulations with windows generated by the operating system can be done, but also some additional actions can be performed concurrently. For example, content of files can be altered without a prompt from the operating system. A file system can be implemented in the same VM or in a different VM, and the content of files can be read from either location. In some embodiments, direct access to a storage device when handling files can be implemented with support of a Virtual Machine Monitor or a Hypervisor. As an option, system fonts, color scheme and other settings related to a window representation can be updated to simplify window image recognition.

For those software operations that might be aborted without proper hardware device installation or without software means, e.g., proper drivers or system utilities, virtual hardware devices or other required software components can be installed automatically without a system prompt. Also, components for communication between Host OS and Guest OS and/or between Guest OSes can be installed and used for performing script commands or other software codes that implement similar functions.

The proposed system has a scripting application that is OS-independent, because it runs on top of the host OS and is integrated into a virtualization system. This arrangement has significant advantages over conventional scripting applications, which can only run on system's OS or under a GOS in case of a Virtual Machine (but have only limited utility within that VM and after the GOS is already installed and running). Thus, the conventional scripting applications cannot be used during GOS startup or installation.

Figure 3:
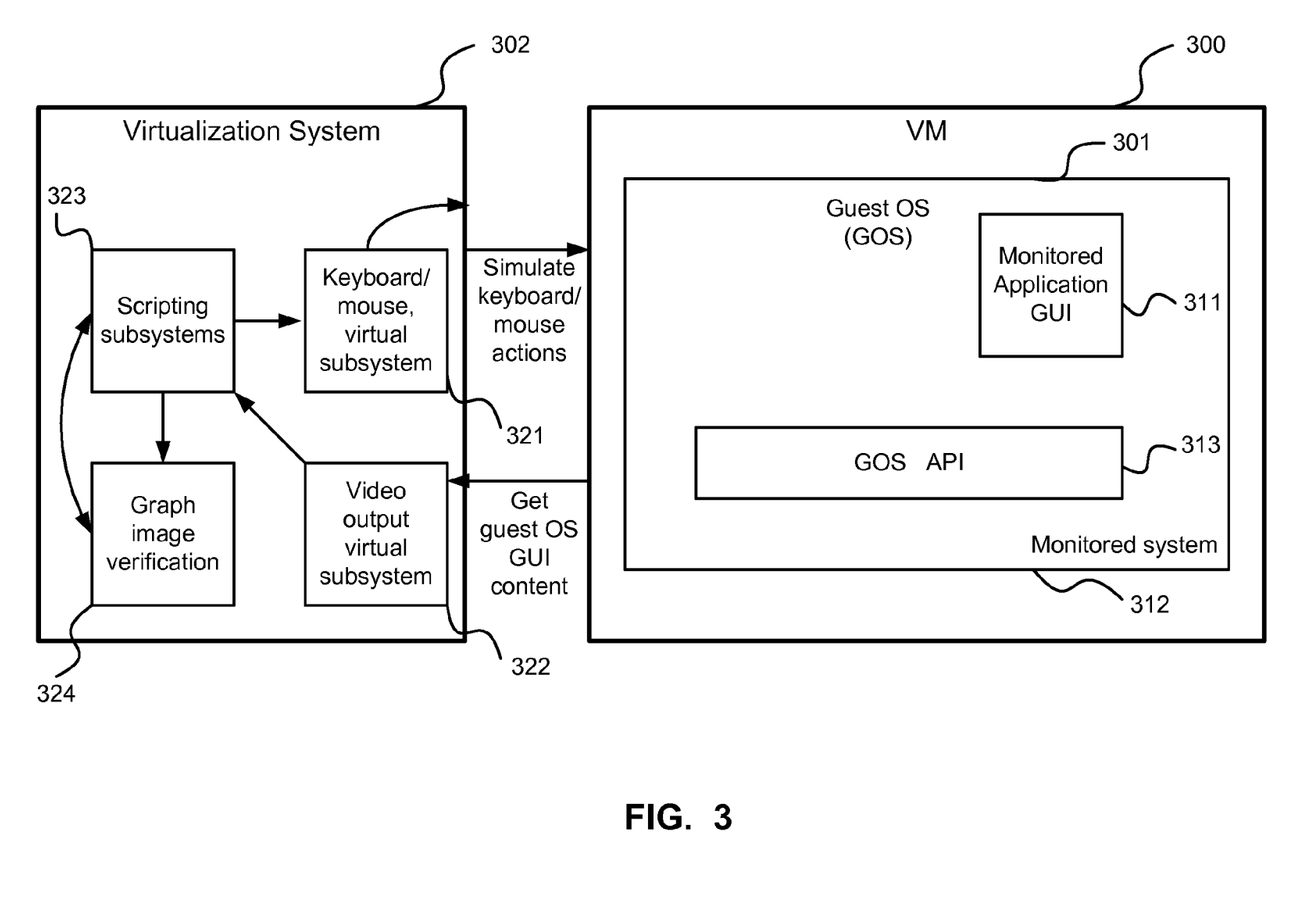
FIG. 3 illustrates a virtualization system with a scripting subsystem in accordance with an exemplary embodiment.

The scripting subsystem of the proposed embodiment can monitor and simulate actions performed during GOS installations. According to the exemplary embodiment, unattended GOS installation can be performed. An example of a proposed system is illustrated in FIG. 3. Virtual Machine 300 has a GOS 301 being installed by a user on a virtual system 312 having its own GOS API 313. Virtualization system 302 acquires GOS GUI content 311 by using functionality of GOS API 313. The user actions, such as mouse clicks and key strokes, are reflected in GUI content 311. The GUI content 311 is presented by a sequence of video frames or dynamic images.

The GOS GUI content 311 is processed in a video output virtual subsystem 322 of a virtualization system 302. The GOS 301 can emulate a video input/output device. Such a device typically has a set of I/O ports used for receiving requests for video data, configurations data and service data needed for forming an image. The commands and service data can be used, for example, for selecting a color scheme for generating the image.

The emulated video device also has a video memory, where digital data pertaining to pixels of a desktop image is stored. The digital data indicates colors and coordinates of pixels of each desktop screen image. In the exemplary embodiment, the virtualization system 302 generates data corresponding to the desktop screen images. Then, these screen images are passed on to the host OS for displaying them on the desktop screen.

The proposed embodiment has advantages since it does not require for the whole desktop screen to be refreshed frequently. Instead, only the contents of the video memory needs to be refreshed when forming new screen windows or when position of mouse cursor changes on the screen. Note that the mouse cursor has a very limited size and does not require updating a great deal of video data. After the contents of the video memory is refreshed, it is passed on to the host OS, and the changes are reflected on the screen.

In one embodiment, the Host API can display bit arrays that have sequential arrangement of pixels, instead of having the pixels located at different addresses. Thus, parameters of the screen image can be defined in a vector-based form.

According to the exemplary embodiment, a portion of the emulated video memory (i.e., frame buffer) can be used for determining positions of windows and the cursor. The information stored in the frame buffer can be used for script generation. When a new screen window is formed or cursor position is changed, or some text is entered, a small portion of the screen (or a video frame) is used. Therefore, only a small set of pixels of the video memory can be selected and used for script generation.

For example, if the Guest OS Screen displays ten windows and one of the windows has an "OK" button on it and the image of the whole window is not needed, then only a portion of interest, such as, for example, only the "OK" button can be selected. The virtualization system 302 has a video output. It is a system that outputs a picture (in a form of a sequence of pixels) that needs to be displayed on a client's console. This picture can also be used for determination of parameters for script generation.

Then, the information is sent to scripting subsystem 323, which incorporates it into a script. Before the data received from the video output virtual subsystem 322 is converted into an executable script, the video frames/images have to be compared and verified in a graph image verification module 324.

In some embodiments, visible guest OS screen image fragments that are pointed to by the user (e.g., using a mouse) are used by the script as arguments, and the user actions are used as methods of the script. In the exemplary embodiment, an image of a window (or a portion of it) can be used as a fragment for script generation. Also, a text input bar and/or position of a mouse cursor can be used as fragments as well.

For example, a user/tester goes through steps of an installation process using a special recording system that allows manual or automatic marking of crucial parts of the installation. During the process, of installation, the user uses images as operative fields, e.g., for choosing and confirming options, entering data and so on. Meanwhile, those images are processed by a recognition feature and by double clicking on a mouse cursor, the user can identify mouse cursor position where substantial part of the image is located. Also system interrupts and delays between the fragments or images can be monitored for future usage in unattended installation.

When installation of a particular OS is implemented, a full installation process can be described, including coordinates of windows and time intervals between their appearances on the screen. In the exemplary embodiment, a mechanism for determining the fragments is implemented in order to provide installations of any type of GOSs.

According to the exemplary embodiment, a fragment or its detailed description can be saved as a file or can be stored in a system RAM, in a clipboard, or in a memory shared by multiple VMs. A range for an image positioning is set, as well as a time of its appearance and an action that needs to be performed upon display of the image. The image positioning determination can be implemented by a user selecting installation fragments and, thereby, setting up properties of a displayed image (i.e., image coordinates, time intervals, color scheme, etc.)

According to the exemplary embodiment, some events can be ignored. For example, some windows can have a validation button and some windows can close automatically if a user does not perform an expected action within a pre-set time interval. These situations are addressed by alternative operations. If a user does not perform an expected action within a pre-set time period, a special script is invoked for resolving this scenario. The special script revokes the time period used for validation of a particular event from the VM and gives it to another VM. Then, when the time period is returned to the first VM, an appropriate operation is automatically invoked.

Then, references to the fragment can be used for comparing them to a window that is currently being generated. Based on the comparison, a call to a corresponding script line is made.

In some embodiments, the comparison can be performed using image recognition software. The image recognition software can be used when an exact match of images for windows with matching functionality is not possible. Such situation may arise, for example, when different color schemes, different system fonts or different resolutions are employed, or even when different skins are used in different VMs. This implementation can be used, for example, when exact position of buttons or check-boxes needs to be determined. Note that the video frame/image verification can be performed outside of the GOS. Once the video frame/image is verified, it can be encoded into the script.

The executable script from the scripting subsystem 323 is provided to keyboard/mouse (or to some other peripheral device) virtual subsystem 321, where the script is executed and the sequence of keyboard/mouse actions is interpreted and then simulated on the VM 300. The simulated sequences allow automatically installing the GOS on the VM 300 without a user input.

In another embodiment, the GOS 301 is already installed on the VM 300 and the simulated keyboard/mouse actions can provide for unattended automated testing of GOS 301. In yet another embodiment the simulated keyboard/mouse actions can perform unattended actions with applications 311 running on the VM 300 or with VM's GOS configuration. Examples of such actions can be allocations of virtual work spaces and various installations (such as, for example, installations on the VM of database clients and proprietary applications for accessing corporate databases, automated installation of other user applications in the VM, etc.)

The automation system depicted in FIG. 3 works with a particular type of a VM 300 or a group of VMs, since the virtualization system 302 is tied to the VM 300, and the scripting subsystems 323 are implemented within the virtualization system 302 (i.e., within a layer of software that normally has the highest privilege level in the system, such as the VMM or a Hypervisor). The automation system depicted in FIG. 3 can perform installation that can be implemented at the level of the virtualization system 302. In other words, the installation can be performed as a part of the virtualization system 302.

Figure 4:
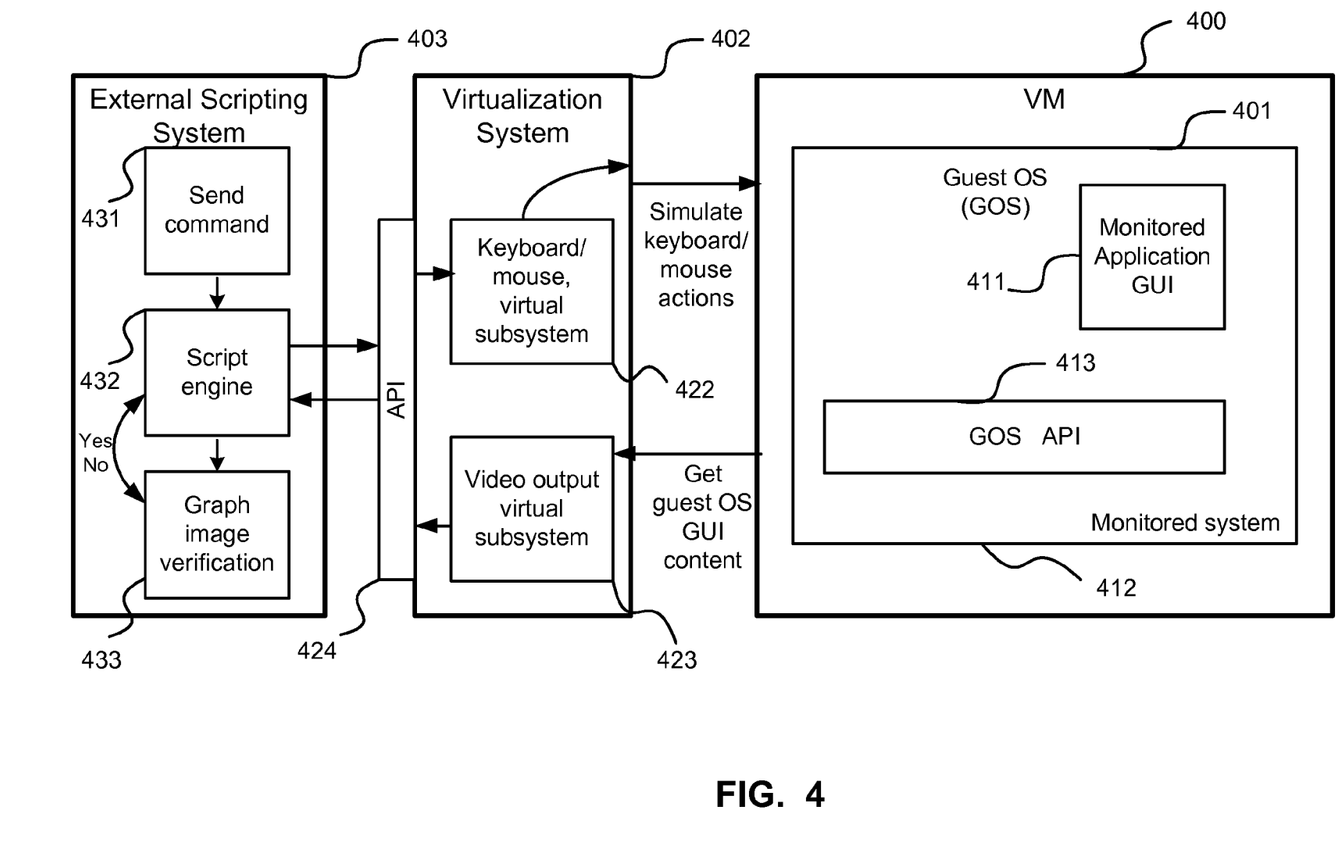
FIG. 4 illustrates a virtualization system with an external scripting system in accordance with an exemplary embodiment.

The proposed system can also be implemented in such a way that the scripting subsystem is completely independent of the VM and its virtualization system. Such a system is illustrated in FIG. 4. The virtualization system depicted in FIG. 4 is implemented using an external scripting subsystem that can work with the internal virtualization system by using its APIs.

The virtualization system 402 is coupled to the VM 400. VM 400 has a GOS 401 being installed by a user on a virtual system 412 having its own GOS API 413. Virtualization system 402 acquires GOS GUI content 411 by using functionality of the GOS API 413. The user actions, such as mouse clicks and key strokes, are reflected in GUI content 411. The GUI content 411 is presented by a sequence of video frames or dynamic images. The sequence of frames of mouse clicks, keyboard strokes and time delays between them are recorded. The system tracks the video frames, and, using the properties of the image in combination with actions and time delays, forms the sequence of mouse clicks.

In an alternative embodiment, the GUI content 411 can be created by execution of special instructions defining how the GUI is rendered. The commands 431 received via GUI content 411 can activate corresponding parameters for controlling components within the VM 400. As discussed in U.S. patent application Ser. No. 11/871,115, entitled MANAGEMENT OF VIRTUAL AND PHYSICAL SERVERS USING GRAPHIC CONTROL PANELS, incorporated herein by reference in its entirety, the approach described therein can be used to control the entire GUI and VM commands, i.e., to implement administrative functions and high level VM commands.

The virtualization system 402 is operationally coupled to an external scripting system 403 via its own API 424. The GOS GUI content 411 is processed in a video output virtual subsystem 423 of a virtualization system 402. Then the information is sent via API 424 to a script engine 432 of the external scripting system 403. The script engine 432 incorporates it into a script.

Before the data received from the video output virtual subsystem 423 is converted into an executable script, the video frames/images have to be compared and verified in a graphical image verification module 433 of the external scripting system 403. The video frame/image verification is not only performed outside of the GOS, but is not necessarily even aware of an originating source of the video frames/images. Once the video frame/image is verified, it can be encoded into the script. A graphical image can be used in a form of a digital image or a pattern. The image can be presented by a raster, by vectors and by a set of symbols.

In order to incorporate all of the delays into the script, the send command module 431 provides the commands for the delays to the script engine 432. Thus, all of the delays between user actions are incorporated into an executable script as well. The executable script is provided to the virtualization system 402 through the API 424. The executable script is executed in the keyboard/mouse virtual subsystem 422 and the sequence of keyboard/mouse actions is interpreted and then simulated on the VM 400. The simulated sequences allow automatically installing the GOS on the VM 400 without a user input. In other words, the simulated sequences provide the GOS installation or other software installation as if the installations were performed by a user.

There are a two types of users of the proposed system:
1. A tester/administrator, who records the entire sequence of actions and events.
2. An end user/client who uses a virtual device. The virtual device provides for hardware emulation as if it were real hardware that performs commands invoked by scripts. Device emulation is implemented via API or via virtual devices that process mouse clicks, keyboard strokes and delays. The emulation can be implemented at USB device level or at driver level.

According to the exemplary embodiment, data inserts from a memory buffer can be used. Thus, it may not be necessary to fill in a "user name" and a "password" fields during each installation. A recording subsystem can mark these fields as "allowed by the user." Then, the system automatically inserts appropriate data into the "user name" and "password" fields prior to power on. This allows the installation script to start installation using the parameters associated with the particular user whose login information was automatically entered.

Note that external scripting system 403 can be used with any type of VM and VM GOS. Alternatively, the external scripting system 403 can be used if the GOS 401 is already installed on the VM 400 and the simulated keyboard/mouse actions can provide for unattended automated testing of GOS 401. In yet another embodiment, the simulated keyboard/mouse actions can perform unattended actions with applications 411 running on the VM 400.

Figure 5:
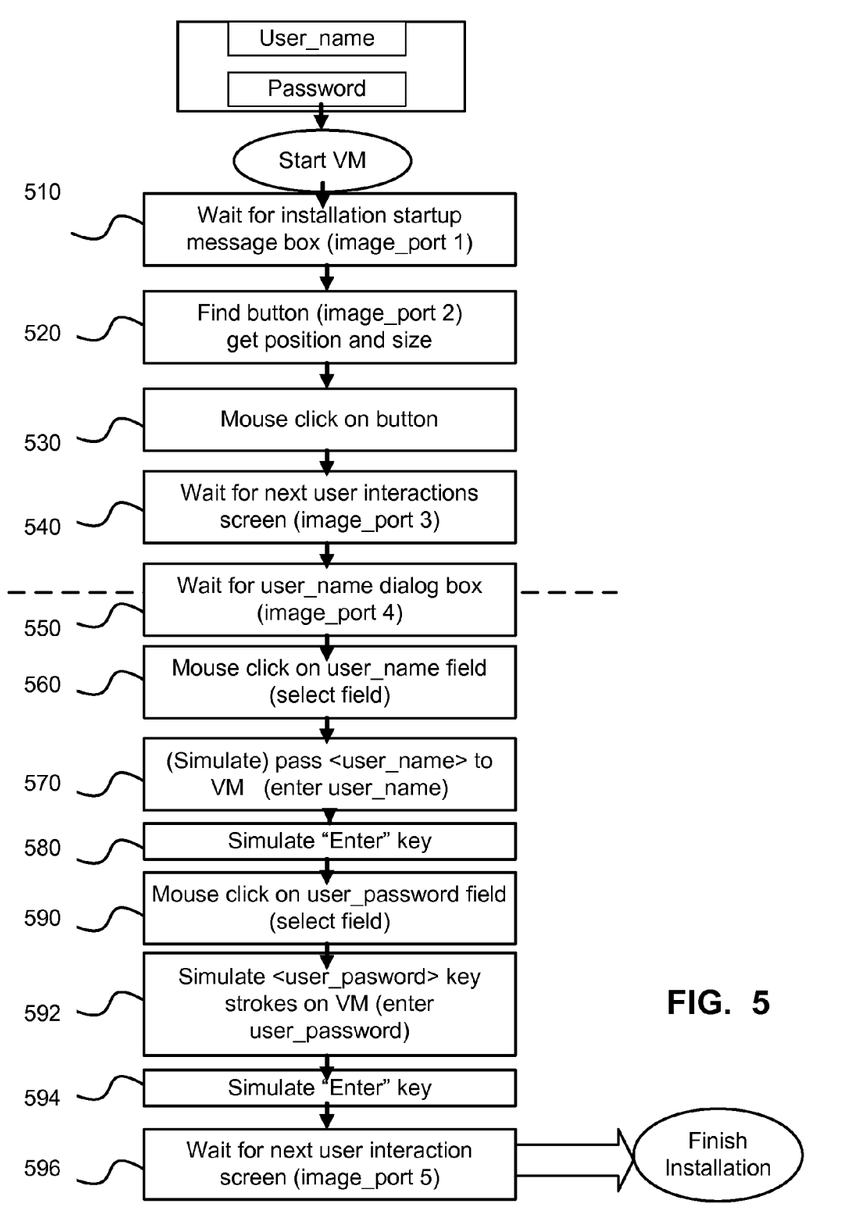
FIG. 5 illustrates an executable script for GOS unattended installation in accordance with an exemplary embodiment.

An example of an algorithm used in executable script for unattended GOS installation is shown in FIG. 5. User actions such as mouse clicks, "enter" keystrokes, entering user name and password are simulated when the script is executed. The user name and password are provided in order to start the VM. Once the VM is started, the script goes to step 510, which issues the command to wait for the message box for the installation start up. This information is processed through the image port 1.

Then the script goes to step 520 and issues the command to find a button, and get its position and size. This information is processed through the image port 2. In step 530, the script issues the command to mouse click on the button. In step 540, the script issues an instruction to wait for the next user interaction screen. This information is processed through the image port 3.

On the user interaction screen, in step 550, the script issues an instruction to wait for a user_name dialog box. This information is processed through image port 4. Then the script, in step 560, issues an instruction to select a user_name field in the dialog box by mouse clicking on it.

The script in step 570 simulates entering the user_name by passing the "user_name" parameter to the VM and, in step, 580 simulates the user hitting the "enter" key. In step 590, the script issues the instruction to select user_password field by the mouse clicking on it. In step 592, the script issues the instruction to enter user_password to the VM by simulating the key strokes.

In step 594, the script issues the instruction to simulate stroking the "enter" key. In step 596 the script issues an instruction to wait for the next user interaction screen. This information is processed through the image port 5. Then the unattended GOS installation is finished. Thus, the execution of this script provides for automatic unattended installation of a guest operating system on a VM.

Figure 6:
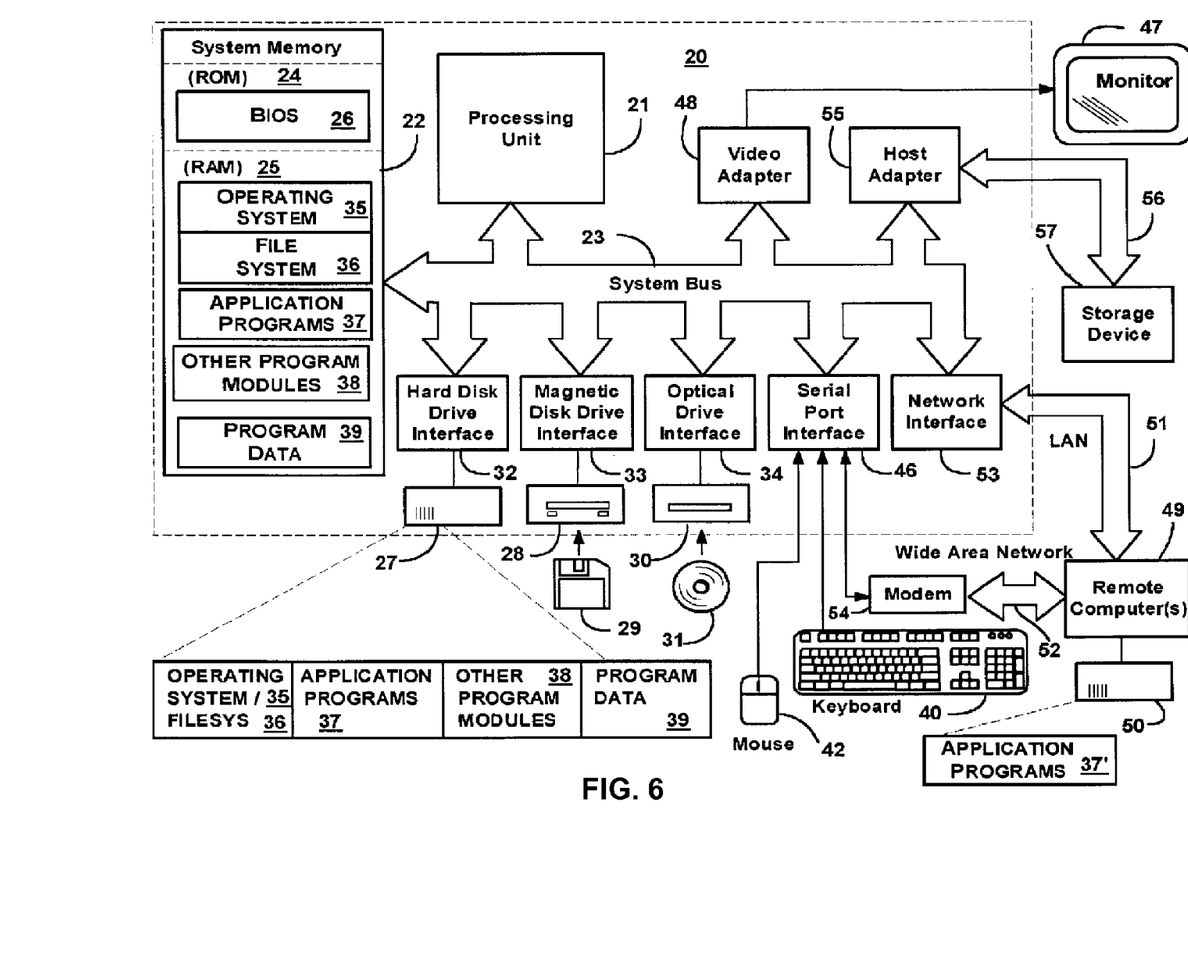
FIG. 6 illustrates an exemplary computer system on which the invention may be implemented.

With reference to FIG. 6, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and system have been achieved. In particular, it should be appreciated by those skilled in the art that system and method described in the preferred embodiment provides for an unattended guest operating system installation on a VM which significantly reduced system operational costs.

It should also be appreciated that various modifications, adaptations, and alternative embodiments thereof may be made within the scope and spirit of the present invention. The invention is further defined by the following claims.

What is claimed is:

1. A method for handling a guest operating system (GOS) behavior, the method comprising:
    activating a first Virtual Machine (VM) on a computer system having a host OS;
    launching a scripting system in the host OS for capturing user actions in the VM as they relate to screen images generated within the Virtual Machine, wherein the scripting system has a highest possible privilege level;
    generating, by the scripting system, from VM video frames, an executable script; and
    automatically manipulating a GOS in a second VM by executing the executable script in the host OS and outside the VM and providing the user actions and the interaction between the user actions and the screen images to the GOS,
    wherein the scripting system records user actions performed during a specified recording period, and generates the executable script based on the recorded user actions, and
    wherein the scripting system records guest OS screen image fragments pointed to by the user, and the executable script includes the fragments as arguments, and the recorded user actions as methods.

2. A method for unattended installation of a guest operating system (GOS), the method comprising:
    activating a Virtual Machine (VM) on a computer system having a host OS;
    installing a GOS in the VM;
    recording user actions performed during the GOS installation in the VM as they relate to screen images generated within the VM;
    generating an executable script based on recorded user actions and the interaction between the user actions and the screen images,
    wherein the user actions are performed during a specified recording period, and
    further comprising recording guest OS screen image fragments pointed to by the user, such that the executable script includes the fragments as arguments, and the recorded user actions as methods; and
    automatically installing the GOS in a different VM by executing the script with a highest privilege level available on the computer and in the host OS.

3. The method of claim 2, wherein the user actions include any of:
    mouse moves;
    mouse clicks;
    mouse positioning;
    context menu selection;
    window activation;
    windows toggling;
    keyboard strokes; and
    delays between the clicks and the strokes.

4. The method of claim 2, wherein the mouse clicks invoke events, the keystrokes enter data, and the mouse moves control cursor positioning.

5. The method of claim 2, wherein the delays are caused by the user waiting for a graphical entity to appear.

6. The method of claim 2, wherein generating of the executable script includes verification of a window image.

7. The method of claim 2, further comprising testing the GOS by executing the script.

8. The method of claim 2, further comprising installing the GOS applications by executing the script.

9. A system for handling a guest operating system (GOS) behavior, the system comprising:
- a hardware computer system having a host OS;
- an executable script that automatically manipulates a GOS in a Virtual Machine and provides user actions to the GOS, wherein the script executes in the host and outside the Virtual Machine; and
- a scripting system for generating the executable script, wherein the scripting system has a highest privilege level available on the computer and includes a script recording subsystem for capturing the user actions from video frames as they relate to screen images generated within the Virtual Machine,
- wherein the executable script is generated based on the user actions and the interaction between the user actions and the screen images,
- wherein the script recording subsystem records user actions performed during a specified recording period, and generates the executable script based on the recorded user actions, and
- wherein the script recording subsystem records guest OS screen image fragments pointed to by the user, and the executable script includes the fragments as arguments, and the recorded user actions as methods.

10. The system of claim 9, wherein the executable script detects screen image fragments in the GOS screen image content.

11. The system of claim 10, wherein the executable script is used for unattended installation of the GOS.

12. The system of claim 10, wherein the executable script is used for product installation.

13. The system of claim 9, wherein the executable script is generated by a virtualization system.

14. The system of claim 9, wherein the scripting system is external.

15. The system of 9, wherein the virtualization system comprises:
- a video output virtualization module; and
- a keyboard/mouse virtualization module.

16. The system of claim 9, wherein the external scripting system comprises:
- a script engine module;
- an image verification module; and
- a common module.

* * * * *